United States Patent
Mallart et al.

[11] Patent Number: 5,276,654
[45] Date of Patent: Jan. 4, 1994

[54] APPARATUS FOR THE EXAMINATION OF OBJECTS BY ULTRASONIC ECHOGRAPHY

[75] Inventors: Raoul Mallart, Paris; Mathias Fink, Meudon, both of France

[73] Assignee: U.S. Philips Corporating, New York, N.Y.

[21] Appl. No.: 976,106

[22] Filed: Nov. 13, 1992

[30] Foreign Application Priority Data

Nov. 18, 1991 [FR] France .................. 91 14175

[51] Int. Cl.$^5$ .................................. G03B 42/06
[52] U.S. Cl. .......................... 367/7; 367/103; 128/661.01
[58] Field of Search ............... 367/103, 7; 364/413.25, 364/; 128/661.01

[56] References Cited

U.S. PATENT DOCUMENTS 4,882,714 11/1989 Tanigawa ..................... 367/103
4,893,183 1/1990 Pesque ........................... 367/7

FOREIGN PATENT DOCUMENTS 0335578 10/1989 European Pat. Off. .

OTHER PUBLICATIONS

"High-Speed Ultrasound Volumetric Imaging System — Part II: Parallel Processing and Image Display", by Olaf T. von Ramm et al., IEEE Transactions on Ultrasonics, Ferroelectrics and Frequency Proceedings, vol. 2, Mar. 1991.

"Golay Codes for Simultaneous Multi-Mode Operation in Phased Arrays", by B. B. Lee et al., 1982 IEEE Ultrasonics Symposium Proceedings, vol. 2, pp. 821-825, Oct. 27, 1982.

Primary Examiner—Daniel T. Pihulic
Attorney, Agent, or Firm—Jack D. Slobod

[57] ABSTRACT

An apparatus for the examination of an object by ultrasonic echography, includes an array of n ultrasonic transducers which is associated with a stage for the emission of signals for scanning the object and with a stage for receiving and processing echographic signals returned to the transducers, by the obstacles encountered in the object scanned. The emission stage is configured for the focusing of m simultaneously emitted ultrasonic beams, by virute of n emission modules, each of which, for example, the $i^{th}$ emission module, itself contains m signal generators ($201a_1, \ldots, 201m_1$) which are connected in parallel (or a single signal generator followed by m parallel-connected delay circuits), a stage ($202i$) for combining the m signals thus generated, and an amplifier ($203i$) for applying the amplified combined signal to the transducer ($10i$) corresponding to the relevant emission module.

3 Claims, 2 Drawing Sheets

APPARATUS FOR THE EXAMINATION OF OBJECTS BY ULTRASONIC ECHOGRAPHY

FIELD OF THE INVENTION

The invention relates to an apparatus for the examination of objects by ultrasonic echography, comprising an array of n ultrasonic transducers which are associated with a stage for the emission of signals for scanning the object and with a stage for receiving and processing echographic signals returned to said transducers by the obstacles encountered in the object scanned. The invention can be used notably in the medical field, for example for cardiac echography, but can be used as well for the analysis of objects other than biological tissues, for example for non-destructive testing of a wide variety of materials.

BACKGROUND OF THE INVENTION

European Patent Application EP-0 323 668, which corresponds to U.S. Pat. No. 4,893,283, describes an apparatus of this kind in which an interesting compromise is realised between the rate of operation and the resolution. The described solution consists in the successive emission, be it as closely successive as possible, of m focused ultrasonic beams in m different directions, the reception and processing of the echographic signals formed being provided by known means for simultaneously focusing the m ultrasonic beams from said m directions (these known means are described, for example in the article by O. T. von Ram, S. W. Smith and H. E. Pavy "High-speed ultrasound volumetric imaging system, part II: Parallel processing and image display", IEEE Trans. on UFFC, Vol. 38, No. 2, March 1991, pp. 109-115). However, using this apparatus it is necessary to wait until all successive emissions have been completed before the reception of the echographic signals returned to the transducers may commence (this emission sequence has a duration equal to the sum of the maximum delay times corresponding to each focusing rule for the emitted beams). Actually, it is impossible to emit and receive simultaneously by means of a transducer. These restrictions in respect of time on the one hand limit the number of beams to be emitted and on the other hand lead to the exclusion of a given object thickness from the zone to be scanned, which thickness constitutes a kind of dead zone corresponding to the part of the object situated nearest to the transducer array.

SUMMARY OF THE INVENTION

It is an object of the invention to propose an apparatus for the examination of objects by ultrasonic echography in which these limitations have been eliminated to a high degree.

To this end, a first embodiment of the apparatus in accordance with the invention is characterized in that said emission stage comprises means for focusing m simultaneously emitted ultrasonic beams, which means consist of n emission modules, each of which itself comprises m parallel signal generators, a stage for combining the m signals thus generated, and an amplifier for applying the amplified combined signal to the transducer corresponding to the relevant emission module, a second embodiment being characterized in that said emission stage comprises means for focusing m simultaneously emitted ultrasonic beams, which means consists of n emission modules, each of which itself comprises a signal generator, m parallel delay circuits, a stage for combining the m signals thus generated, and an amplifier for applying the amplified combined signal to the transducer corresponding to the relevant emission module.

For a better understanding of the effectiveness of the proposed configuration it is assumed that the relevant medium to be scanned contains two reflective obstacles which have a reflectivity $R_1$ and $R_2$, respectively, and which are situated at the same distance from the emission array. When such reflectors receive an ultrasonic pulse propagating as a plane wave, two signals or echos of an amplitude proportional to $R_1$ and $R_2$ are returned to the emission array. If the echo signal received by each transducer element of said array is stored, for example in a digital memory, and if the memories corresponding to each element are read simultaneously in the way of a FIFO (First-In, First-Out) memory (which process can be referred to as a time-reversible process), these transducer elements can be re-excited by the same echos but with a time inversion. This method of excitation of the array produces, because of the reversibility, two simultaneous beams whose amplitudes are identical to those of the previous beams and still proportional to $R_1$ and $R_2$ and which are focused on the two reflectors initially considered.

Analysis of the operations executed above gives rise to two remarks. On the one hand, the echos received by the transducer elements of the array and stored by memories simply form the sum of the two leading edges of spherical waves, centred on the two reflectors, because of the linearity of all implied ultrasonic or electronic phenomena (energy conversion, propagation, diffraction, digital-to-analog conversion, . . . ). On the other hand, successive iterations of the reversible process described above each time produce two ultrasonic beams and, at the end of the $n^{th}$ iteration, the two beams will have an amplitude proportional to $R_1^n$ and $R_2^n$, respectively. When n is sufficiently large and, for example $R_1$ is greater than $R_2$ (or vice versa), the amplitude of the second beam (or of the first beam, respectively) will become negligibly small and only one beam will remain focused on the corresponding reflector. However, if R, and $R_2$ are equal coefficients, the two leading edges will strictly retain the same amplitude; therefrom it is deduced that the condition to be satisfied so as to achieve simultaneous transmission of two beams consists in that the excitation signals should correspond to the sum of two leading edges of spherical waves of the same amplitude.

The conclusion drawn from the two foregoing remarks can be generalized for arbitrary number of beams: the condition to be satisfied for simultaneous transmission of m beams consists in that the excitation signals should correspond to the sum of m leading edges of spherical waves of the same amplitude. In the case of a single beam, the required excitation signal, i.e. the leading edge of a spherical wave centred on the reflector or a desired focal point, is formed by a group of ultrasonic pulses with a spherical delay such as supplied by contemporary aperture-type ultrasonic echography systems (generally speaking, comprising a pulse generator and a number of delay lines equal to the number of transducer elements to be excited by a respective pulse). Likewise, in the case of m beams, the overall excitation signal of the transducer configuration, i.e. m leading edges of spherical waves of the same amplitude and centred on m focal points, is obtained by linear summing of m similar groups of pulses with a spherical delay and oriented to the corresponding focal point, i.e. m groups associated with a respective delay rule enabling focusing of the relevant beam on one of the m focal points.

As a result of this construction, the emission duration may be reduced to a value simply equal to the largest delay associated with each of the m relevant focusing delay rules, enabling an increase of the operation rate and at the same time a reduction of depth of the dead zone excluded from scanning or, when said depth remains constant, an increase of the number m of beams that can be emitted.

European Patent Application EP-0 335 578 describes an ultrasonic imaging system comprising means for focusing simultaneously emitted ultrasonic beams. However, these simultaneous emissions originate from two (or more) simultaneously active distinct acoustic apertures which actually constitute, relative to the complete array of elementary ultrasonic transducers, as many independent sub-arrays and with which there are not necessarily associated directions which are completely independent from one another.

The present case does not concern the use of quasi-independent groups of transducers but rather the participation of an entire acoustic aperture in the focusing of m beams simultaneously emitted in m different directions. This result is obtained by the superposition, on the same elementary transducers, of m distinct focusing rules, the emission stage enabling said simultaneous emission being constructed in conformity with the embodiments described above and elaborated in detail hereinafter.

In order to achieve said simultaneous emission, the combination stage of said emission stage may be a summing device comprising m inputs in a first embodiment, the n amplifiers offering continuous gain throughout the relevant dynamic range. In another embodiment of the apparatus, said stage no longer emits the exact sum of the m signals, but a simpler combination which constitutes an approximation of said desired exact sum. This combined signal is obtained, for example by means or a logic OR-circuit, in which case the n amplifiers may have merely two output levels.

BRIEF DESCRIPTION OF THE DRAWINGS

The aspects of the invention will become apparent from the following description, given with reference to the annexed drawings which are given by way of non-limitative examples; therein.

DESCRIPTION OF PREFERRED EMBODIMENTS

Figure 1:
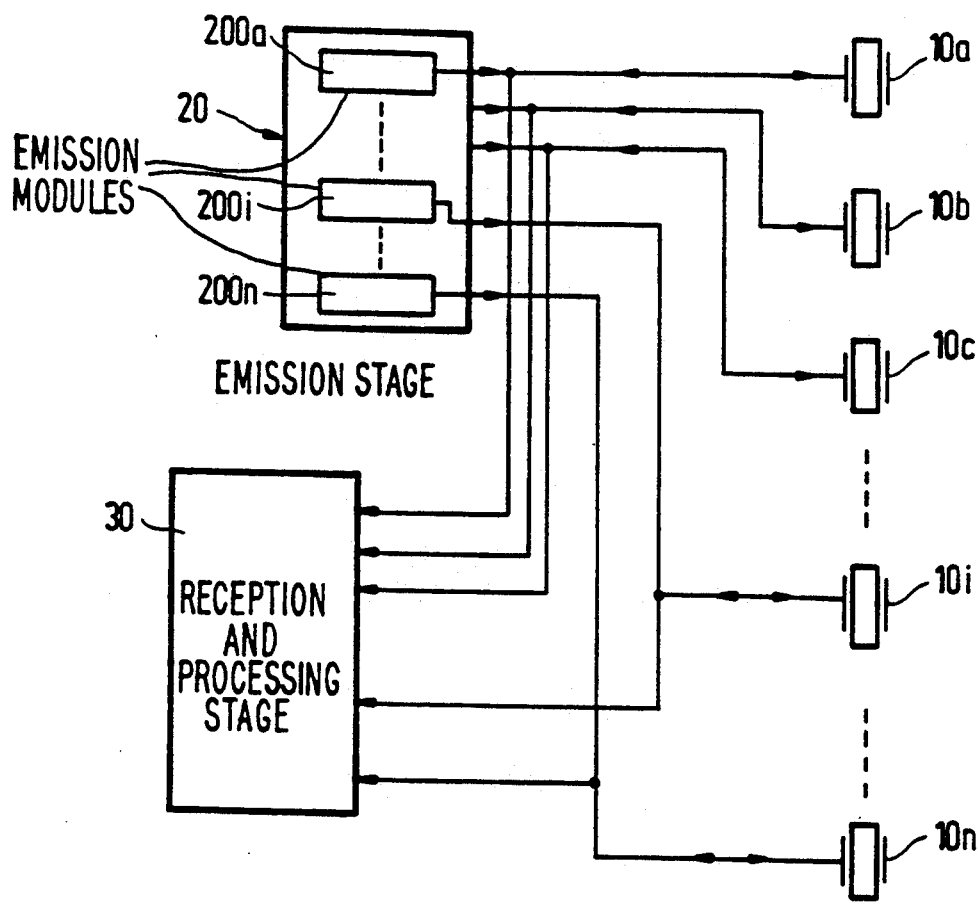
FIG. 1 shows diagrammatically the construction of an ultrasonic echograph in accordance with the invention.

An apparatus for the examination of objects by ultrasonic echography in accordance with the invention comprises, as shown in FIG. 1, a transducer system which is in this case formed by an array of n ultrasonic transducers $10a, 10b, 10c, \ldots, 10i, \ldots, 10n$. With the array there are associated on the one hand a stage 20 for the emission of ultrasonic signals to the object to be scanned and on the other hand a stage 30 for the reception and processing of the echographic signals refumed to the transducers $10a$ to $10n$ by the various obstacles encountered by the emitted signals in said object.

Figure 2:
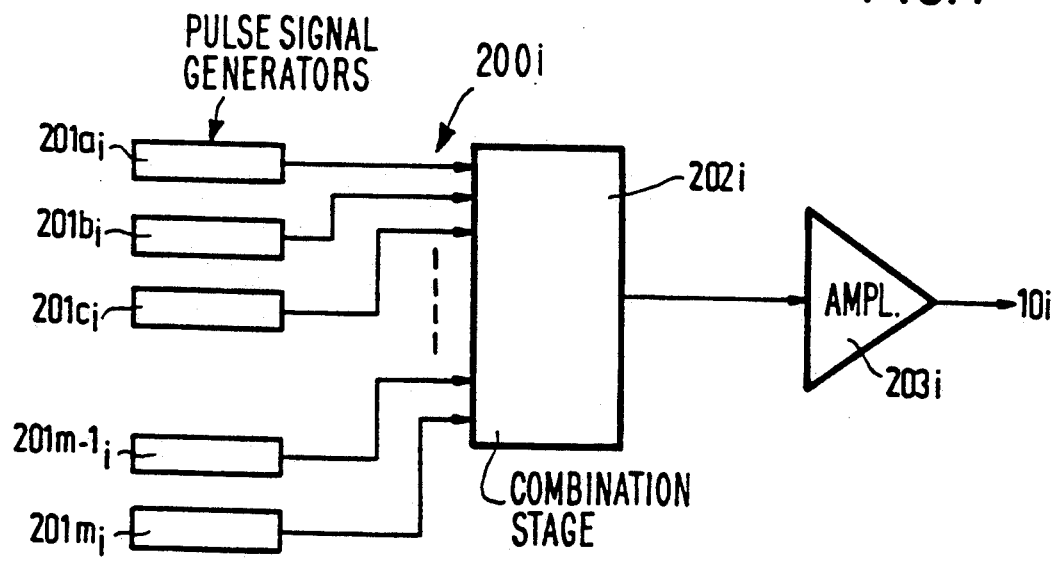
FIGS. 2 and 3 show, in an apparatus as shown in FIG. 1, two embodiments of one of the emission modules of an emission stage in accordance with the invention.

In accordance with the invention, the emission stage 20 comprises n emission modules $200a, \ldots, 200i, \ldots, 200n$ (where, for example n=64). Each of said n modules, for example the $i^{th}$ module shown in FIG. 2, itself comprises m pulse signal generators $201a_1$ to $201m_1$, m being the number of beams to be emitted in m distinct directions (tests have been performed, for example with m=5). In this $i^{th}$ emission module $200i$, the m generators $201a_1$ to $201m_1$ are connected in parallel and their m outputs constitute the parallel-connected inputs of combination stage $202i$ for combining the m signals thus generated. An amplifier $203i$ is provided to apply the amplified, combined signal to the transducer corresponding to the relevant emission module.

Figure 3:
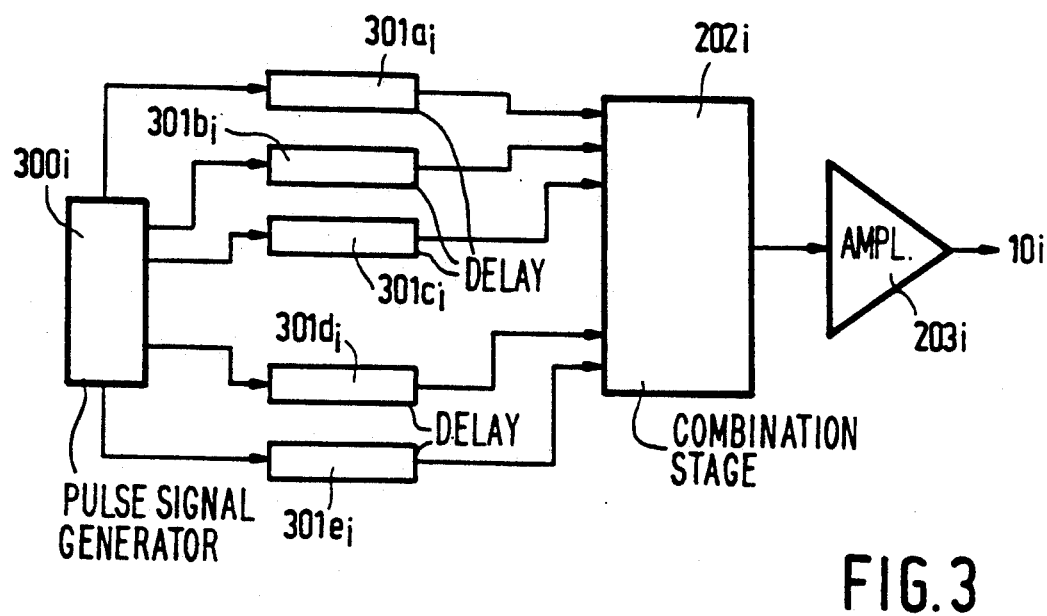

The ultrasonic phenomena considered being linear, the construction of the described emission stage enables simultaneous emission of the sum of the m signals which, taken individually, would correspond to an emission in each of the relevant m directions. To this end, the excitation mode of each transducer, and hence the instant of triggering of each of the m generators of each module $200a$ to $200n$, are influenced so as to obtain a complex delay rule which is, in conformity with said linearity principle, the sum of the elementary delay rules corresponding to a distinct emission in time in said m directions. As appears from the embodiment of the emission module shown in FIG. 3, the same result can be obtained by replacing, in each of the n modules, the m generators $201a_1$ to $201m_1$ by a single pulse signal generator $300i$, followed by m delay circuits $301a_i, 302b_i, 301c_i, \ldots, 301m-1_i, 301m_i$.

In the described embodiment, the n combination stages, only the $i^{th}$ stage $202i$ being shown, are m-input summing devices and the amplified, combined output signal applied to each transducer corresponds exactly to the theoretically resultant signal for the combination of the m desired emission rules.

Figure 4:
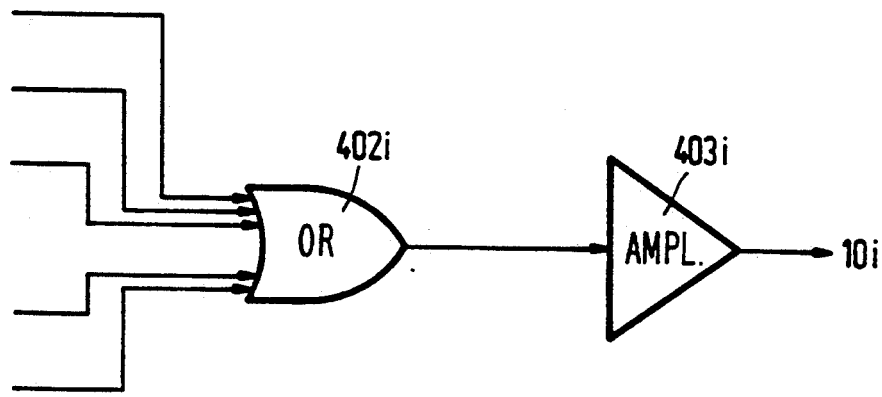
FIG. 4 shows an alterative version of the configuration of each of the emission modules of FIG. 2 or FIG. 3.

Within the scope of the present invention a comparable technical result can be obtained by adopting a modified construction for the combination stage, in which the elements $202i$ and $203i$ are replaced by the elements $402i$ and $403i$ shown in FIG. 4. To this end, it is acceptable to supply each transducer with an amplified combined signal which is only an approximation of the foregoing signal by no longer emitting the exact sum signal but rather an approximated signal obtained at the output of a combination stage $402i$ which is then formed by a logic OR-circuit. This logic OR-circuit of each module is connected to the output of m generators $201a_1$ to $201m_1$ (or, as the case may be, of the m delay circuits $301a_i$ to $301m_i$ connected in parallel to the output of the single generator $300i$) and outputs a combined signal which is active while at least one of the output signals of the m generators $201a_1$ to $201m_1$ (or, as the case may be, of the m delay circuits $301a_i$ to $301m_i$) itself is active. Thus binary summing is achieved and the amplifier $403i$ succeeding said stage $402i$ is simpler because two output levels suffice for this amplifier so that it need not be an amplifier with continuous amplification in a given dynamic range.

The subsequent reception and processing of the signals thus emitted (in one embodiment or the other) are of a known type (see notably the cited document "IEEE Trans. on UFFC") so that they will not be described herein.

We claim:

1. An apparatus for examining objects by ultrasonic echography, comprising an array of n ultrasonic transducers which is associated with an emission stage for emitting ultrasonic signals to scan the object and with a stage for receiving and processing ultrasonic signals returned to said transducers by obstacles encountered in the object scanned, said emission stage comprising means for focusing m simultaneously emitted ultrasonic beams, which focusing means comprises n emission modules associated with the respective n ultrasonic transducers, each emission module comprising means for generating m respective signals, logic OR-circuit means for combining the m respective signals generated by the generating means to form a combined signal, and an amplifier for amplifying the combined signal into an amplified combined signal having two levels and for applying the amplified combined signal to the transducer associated with the emission module, where m is an integer greater than 1 and n is an integer greater than m.

2. An apparatus as claimed in claim 1, wherein said generating means comprises m parallel signal generators.

3. An apparatus as claimed in claim 1, wherein said generating means comprises a signal generator feeding m parallel delay circuits.

* * * * *